US010814858B2

(12) United States Patent
Cai et al.

(10) Patent No.: US 10,814,858 B2
(45) Date of Patent: *Oct. 27, 2020

(54) MANAGING ENGINE FIRING FRACTION CHANGES DURING GEAR SHIFTS

(71) Applicant: Tula Technology, Inc., San Jose, CA (US)

(72) Inventors: Xiaoping Cai, Fremont, CA (US); Louis J. Serrano, Los Gatos, CA (US); Andrew W. Phillips, Rochester, MI (US)

(73) Assignee: Tula Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/800,976

(22) Filed: Feb. 25, 2020

(65) Prior Publication Data
US 2020/0189555 A1 Jun. 18, 2020

Related U.S. Application Data

(63) Continuation of application No. 16/210,710, filed on Dec. 5, 2018, now Pat. No. 10,611,359.

(51) Int. Cl.
B60W 10/06 (2006.01)
B60W 10/11 (2012.01)
(Continued)

(52) U.S. Cl.
CPC .......... B60W 10/06 (2013.01); F02D 13/06 (2013.01); F02D 17/02 (2013.01); F02D 41/0087 (2013.01); F02D 2250/18 (2013.01)

(58) Field of Classification Search
CPC ...... B60W 10/06; B60W 10/11; B60W 30/19; B60W 30/20; B60W 2030/206;
(Continued)

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

JP 2017-044136 3/1917
JP 2013-142457 7/2013
(Continued)

OTHER PUBLICATIONS

Cai et al., U.S. Appl. No. 16/210,710, filed Dec. 5, 2018.
International Search Report and Written Opinion dated Mar. 27, 2020 from International Application No. PCT/US2019/063974.

Primary Examiner — Edwin A Young
(74) Attorney, Agent, or Firm — Beyer Law Group LLP

(57) ABSTRACT

Methods and controllers for coordinating firing fraction transitions that occur in conjunction with transmission shifts are described. In some embodiments, when a transmission shift to a target gear is expected, a target firing fraction is determined that is desired for use after the shift has completed. In selected circumstances, the change to the target firing fraction is initiated prior to the shift to the target gear. The transition to the target firing fraction preferably completes before an inertia/speed phase of the shift. In other embodiments, the engine transitions to all cylinder operation or other suitable transitional firing fraction in response to an expected transmission shift. After the shift completes, a transition is made to a target firing fraction. The described approaches are well suited for use during skip fire or other cylinder output level modulation operation of the engine and are particularly beneficial during up-shifts.

26 Claims, 4 Drawing Sheets

(51) Int. Cl.
*F02D 17/02* (2006.01)
*F02D 13/06* (2006.01)
*F02D 41/00* (2006.01)

(58) Field of Classification Search
CPC .... B60W 2710/06; F02D 13/06; F02D 17/02;
F02D 41/0087
See application file for complete search history.

(56) References Cited

U.S. PATENT DOCUMENTS

| | | | |
|---|---|---|---|
| 4,509,488 | A | 4/1985 | Forster et al. |
| 5,377,631 | A | 1/1995 | Schechter |
| 5,540,633 | A | 7/1996 | Yamanaka et al. |
| 6,158,411 | A | 12/2000 | Morikawa |
| 6,619,258 | B2 | 9/2003 | McKay et al. |
| 7,063,062 | B2 | 6/2006 | Lewis et al. |
| 7,066,136 | B2 | 6/2006 | Ogiso |
| 7,086,386 | B2 | 8/2006 | Doering |
| 7,503,312 | B2 | 3/2009 | Surnilla et al. |
| 7,577,511 | B1 | 8/2009 | Tripathi et al. |
| 7,930,087 | B2 | 4/2011 | Gibson et al. |
| 8,099,224 | B2 | 1/2012 | Tripathi et al. |
| 8,886,422 | B2 | 11/2014 | Sujan et al. |
| 9,020,714 | B2 | 4/2015 | Saito et al. |
| 9,086,020 | B2 | 7/2015 | Tripathi et al. |
| 9,200,575 | B2 | 12/2015 | Shost et al. |
| 9,200,587 | B2 | 12/2015 | Serrano et al. |
| 9,341,128 | B2 | 5/2016 | Hayman et al. |
| 9,399,964 | B2 | 7/2016 | Younkins et al. |
| 9,745,905 | B2 | 8/2017 | Pirjaberi et al. |
| 9,777,658 | B2 | 10/2017 | Nagashima et al. |
| 9,964,051 | B2 | 5/2018 | Pirjaberi et al. |
| 10,138,860 | B2 | 11/2018 | Nagashima et al. |
| 10,161,328 | B2 | 12/2018 | Serrano |
| 10,611,359 | B1* | 4/2020 | Cai ........................ F02D 13/06 |
| 2010/0012053 | A1 | 1/2010 | Surnilla et al. |
| 2010/0050993 | A1 | 3/2010 | Zhao et al. |
| 2015/0260117 | A1 | 9/2015 | Shost et al. |
| 2015/0354470 | A1 | 12/2015 | Li et al. |
| 2017/0030278 | A1 | 2/2017 | Phillips |
| 2017/0067401 | A1* | 3/2017 | Pirjaberi ................ F02D 17/02 |

FOREIGN PATENT DOCUMENTS

| | | |
|---|---|---|
| WO | WO 2010/006311 | 1/2010 |
| WO | WO 2011/085383 | 7/2011 |

* cited by examiner

MANAGING ENGINE FIRING FRACTION CHANGES DURING GEAR SHIFTS

CROSS-REFERENCE TO RELATED APPLICATIONS

This application is a Continuation of U.S. application Ser. No. 16/210,710 filed on Dec. 5, 2018, which is incorporated herein by reference in its entirety.

FIELD OF THE INVENTION

The present invention relates generally to methods and arrangements for managing engine firing fraction transitions during transmission gear shifts. Some described embodiments are particularly well adapted to manage transitions between firing fractions during gear shifts that occur during skip fire or other dynamic cylinder output level modulation operation of an engine.

BACKGROUND

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement of an engine involves deactivating a group of cylinders substantially simultaneously. In this approach, no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation. For example, an 8 cylinder variable displacement engine may deactivate half of the cylinders (i.e. 4 cylinders) so that it operates using only the remaining 4 cylinders. Commercially available variable displacement engines available today typically support only two or at most three fixed mode displacements. In contrast, during skip fire engine operation, the engine is not constrained to fire the same set of cylinders each engine cycle. For example, a particular cylinder may be fired during one engine cycle and then may be skipped during the next engine cycle and then selectively skipped or fired during the next.

In general, skip fire engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns.

Many skip fire controllers are arranged to provide a set of available firing patterns, sequences or firing fractions. In some circumstances the set of available firing patterns or fractions will vary as a function of various operating parameters such as engine load, engine speed and transmission gear. Typically the available firing patterns are selected, in part, based on their NVH characteristics. Transitions between firing fraction levels must be managed to avoid unacceptable NVH during the transition. In particular, changes in the firing fraction must be coordinated with other engine actuators to achieve smooth firing fraction transitions.

The Applicant has developed a technology referred to as dynamic skip fire in which firing decisions are made on a cylinder firing opportunity by cylinder firing opportunity basis. Various aspects of dynamic skip fire are described in a number of patents including U.S. Pat. Nos. 7,954,474, 7,886,715, 7,849,835, 7,577,511, 8,099,224, 8,131,445, 8,131,447, 8,616,181, 8,701,628, 9,086,020 9,328,672, 9,387,849, 9,399,964, 9,512,794, 9,745,905, and others, each of which is incorporated herein by reference.

In some applications referred to as multi-level skip fire, individual working cycles that are fired may be purposely operated at different cylinder outputs levels—that is, using purposefully different air charge and corresponding fueling levels. By way of example, U.S. Pat. No. 9,399,964 (which is incorporated herein by reference) describes some such approaches.

The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of cylinder output level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis.

When the use of multiple non-zero firing levels is contemplated (e.g., during multi-level skip fire or multi-charge level operation of an engine), it is often efficient to consider an effective firing fraction which correlates to the percentage or fraction of the cylinders that would be fired at a high or reference output. For example, if half of the cylinders are fired at a cylinder output level of 70% of a full firing output and the other half are fired at the full firing output level, then the effective firing fraction would be 85%. In another example, if a quarter of the cylinders are fired at a cylinder output level of 70% of a full firing output, another quarter are fired at the full firing output level, and the other half are skipped, then the effective firing fraction would be 42.5%. In yet another example, if traditional skip fire operation is used (i.e., firing a designated percentage of the firing opportunities), then the effective firing fraction may represent the percentage of the cylinders that are actually fired.

We have observed that during skip fire operation of an engine, undesirable NVH can sometimes occur during transmission shifts—particularly when the effective firing fraction changes during the transmission shift. The present application describes a number of control schemes that can help mitigate undesirable NVH associated with firing fraction changes that occur in association with, or temporally in the vicinity of, a gear shift.

SUMMARY

A variety of methods and controllers for coordinating firing fraction transitions that occur in conjunction with transmission shifts are described. In one aspect, when a transmission shift to a target gear is expected, a target firing fraction is determined that is desired for use after the shift has completed. In selected circumstances, the change to the target firing fraction is initiated prior to the shift to the target gear. The transition to the target firing fraction preferably completes before an inertia/speed phase of the shift. The described approach is well suited for use during power on up-shifts that occur during skip fire or other cylinder output level modulation operation of the engine and are particularly beneficial during up-shifts.

In some embodiments, the firing fraction transition completes before the gear shift begins. In others, the firing fraction transition may overlap with a portion of the fill phase and/or the torque phase of the gear shift.

In another aspect, the engine is transitioned to all cylinder operation or other suitable transitional firing fraction in response to an expected transmission shift. The transitional firing fraction is used during the shift. After the shift is completed, the firing fraction is changed to a target firing fraction that is a preferred operational firing fraction for operation in the second (target) gear once the shift has been completed. The transitional firing fraction is only used in conjunction with the shift and is chosen to have better NVH characteristics than either the original or target firing fraction. In some embodiments, the transitional firing fraction is "one" corresponding to all cylinder operation.

In another aspect, an engine or skip fire controller sends a hold gear shift message/indicator to a transmission controller instructing the transmission controller to a delay shift state when it is determined that a firing fraction transition is desired. In some embodiments, the hold gear shift is explicitly released after the firing fraction transition is completed. In some embodiments, the transmission is not permitted to shift after the hold gear shift indicator is sent until the hold is released by the engine or skip fire controller sending a no-hold shift message/indicator.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present invention relates generally to managing firing fraction transitions associated with gear shifts. We have observed that undesirable NVH can sometimes occur during transmission shifts—particularly when the effective operational firing fraction changes during the transmission shift as is common in skip fire and other output level modulation operation of an internal combustion engine. The present application describes a number of control schemes that can help mitigate undesirable NVH associated with firing fraction changes that occur in association with, or temporally in the vicinity of, a gear shift.

Many modern powertrain control systems include a transmission controller (TCU) and an engine controller (ECU) that operate fairly independently of one another. The TCU typically determines when transmission gear shifts are appropriate, directs the transmissions appropriately to execute the gear shifts and informs other vehicle components of its actions. The TCU typically makes its decisions based on information provided by the ECU and sensors indicating vehicle speed and accelerator pedal position. The TCU will also typically broadcast information about its current state so that other controllers (such as an ECU) can utilize such information in the control of their respective devices. The state information broadcast by the TCU may include information such as: the actual (current) gear; a target gear (when a decision has been made to shift to a different gear); and a shift in progress indicator—which indicates that the transmission is currently in the process of shifting gears. Such information may be broadcast over a suitable vehicle bus such as a controller area network (CAN bus).

Figure 1:
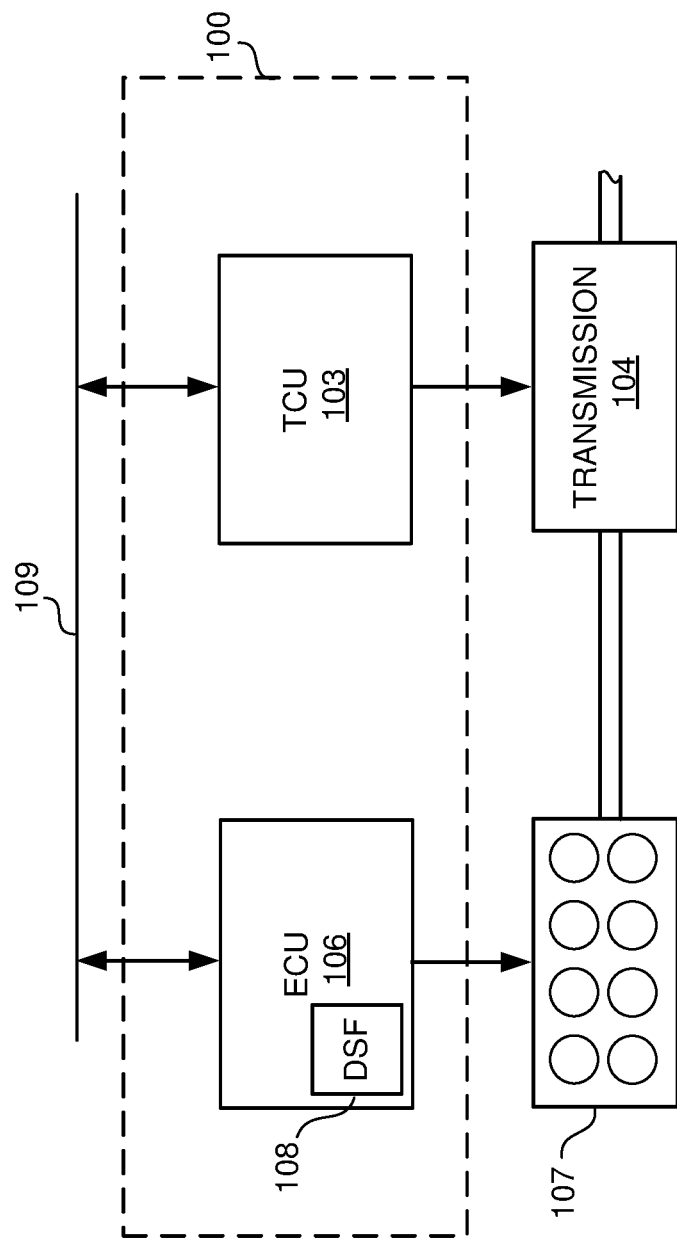
FIG. 1 is a block diagram of a power train control system.

FIG. 1 is a block diagram that diagrammatically illustrates a representative powertrain control module (PCM) 100 that includes a transmission control unit (TCU) 103 and an engine control (ECU) 106. The TCU 103 is configured to control automatic transmission 104. The ECU 106 is configured to control engine 107 and is capable of directing skip fire and/or other cylinder output level modulation operation of the engine. In some embodiments the ECU includes a dedicated skip fire control block 108 that manages skip fire operation of the engine. In the illustrated embodiment skip fire control block 108 implements dynamic skip fire control, which optionally can take a form as described in some of the incorporated patents. In other embodiments, control block 108 may manage other cylinder output level modulation of the engine (e.g. firing level modulation engine operations, etc). The ECU and TCU (as well as other vehicle controllers) are able to communicate with one another over vehicle bus 109.

As suggested above, we have observed that firing fraction changes that occur during gear shifts can sometimes lead to undesirable NVH characteristics. Gear shifts may occur under a variety of different operating conditions and the NVH impacts may vary significantly with the conditions under which the shift occurs. In general, there are up-shifts where the transmission shifts to a higher gear, and down-shifts, where the transmission shifts to a lower gear. When an up-shift occurs during skip fire engine operation at a moderate requested power level, it is often desirable to increase the operational firing fraction in conjunction with the shift to maintain acceptable NVH characteristics, and, as appropriate, a somewhat consistent power output at the reduced engine speed.

There are different phases of a typical shift operation. For the purposes of this description, we will consider three distinct phases of interest which, are referred to as: (1) the fill phase; (2) the torque phase; and (3) the inertia or speed phase. During power-on up-shifts, the three phases typically occur in that order. However, in other types of shifts, the order of the phases may vary and/or different, more or fewer phases, may be included. In the example, the fill phase refers to the time period required to pressurize the hydraulics to the level necessary to activate any relevant clutches. The torque phase refers to the period where the capacity of the clutches associated with the initial and target gears are swapped. That is, the period in which the transmission load is transferred from a clutch associated with the initial gear to a clutch associated with the target gear. At the end of the torque phase, the target gear clutch supports the entire load thereby relieving the initial gear clutch of its load entirely. The inertia/speed phase is the period in which the slip of the target gear clutch is gradually reduced to zero (or its operational slip level) thereby synchronizing the engine speed with the appropriate components of the transmission.

The timing of the various shift phases may vary. By way of example, in some implementations, the fill phase may be on the order of 150 ms, the torque phase on the order of 200-300 ms and the inertia/speed phase on the order of 300-600 ms.

Experience has shown that the nature and magnitude of firing fraction related NVH concerns that occur during shifts can vary significantly based on the nature of the shift and the state of the engine at the time the shift occurs. Therefore, a variety of different firing fraction management protocols are proposed, and the particular management protocol used may vary based on the nature of any particular shift and the state of the engine at the time the shift occurs.

In one example, during power on up-shifts, firing fraction transitions that occur during the inertia/speed phase are the most susceptible to NVH concerns. Therefore, in some embodiments, care is taken to minimize or eliminate the probability that firing fraction changes will occur during the inertial/speed phase of a power-on up-shift. A few such approaches will be described next with reference to FIGS. 2-4.

Figure 2:
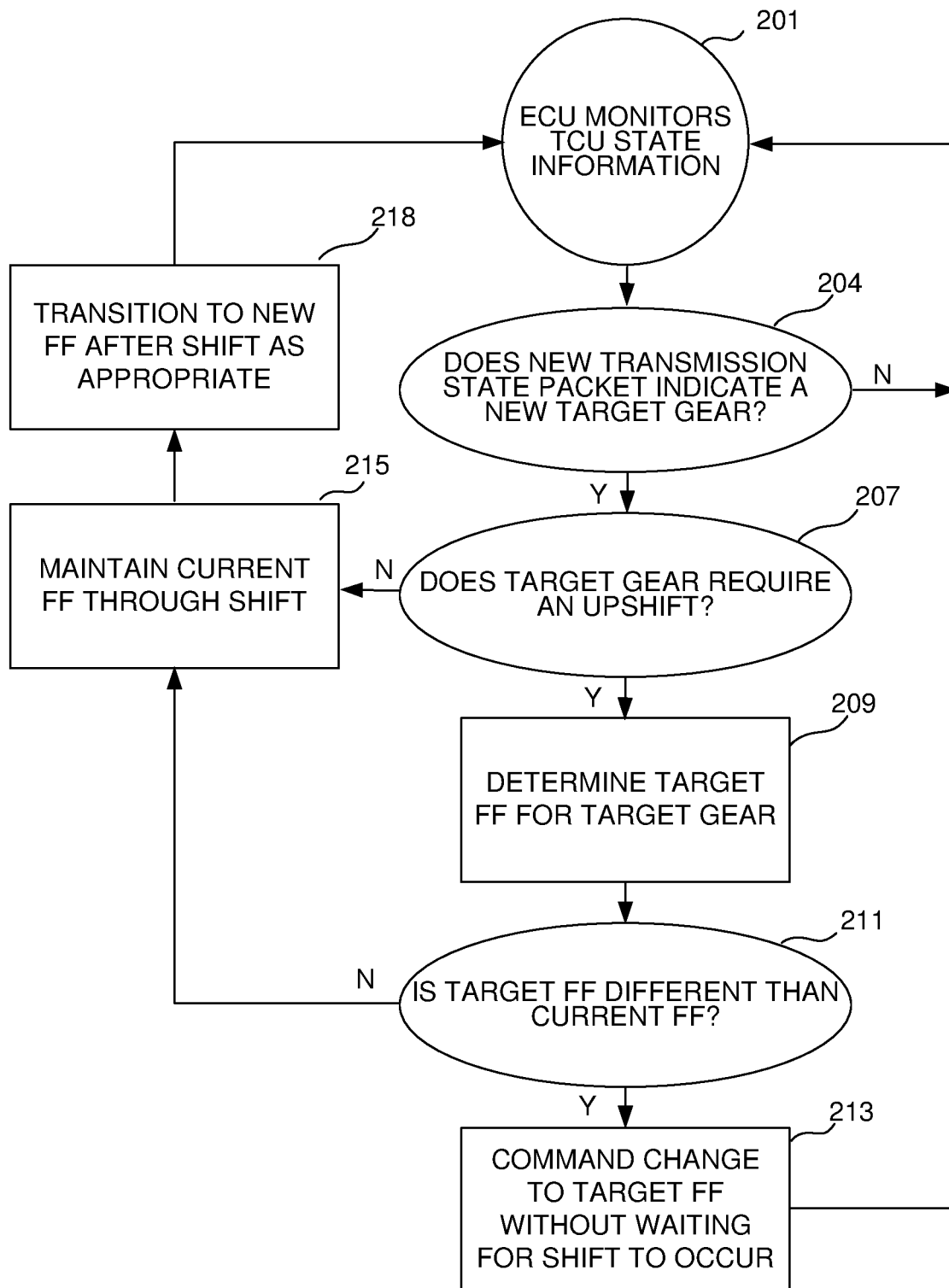
FIG. 2 is a flow chart illustrating a method of managing firing fraction transitions affiliated with gear shifts in accordance with a first embodiment.

In the embodiment of FIG. 2, the ECU 106 (or other skip fire or cylinder output modulation controller) monitors the state information provided by the TCU 103 as represented by block 201. This may be accomplished by listening for transmission status updates on the CAN bus or any other vehicle bus or communication line that the TCU broadcasts on/transmits information over. Each time the ECU receives a transmission status packet, the ECU checks to determine whether the TCU has indicated a new target gear (decision block 204). If not, the ECU continues to monitor for an indication of a new target gear. When the ECU detects that the TCU has identified a new target gear, the ECU determines whether the target gear and current engine state indicate that a qualified power-on up-shift will occur (block 207).

If the target gear shift reflects a qualified power-on up-shift, the ECU determines a target firing fraction, which is the firing fraction (or effective firing fraction) that would be appropriate for the target gear to provide the desired engine power output as represented by block 209. It should be appreciated that when a power-on up-shift occurs, the engine speed is expected to decrease, which means that the frequency of the firing opportunities will go down. As such, when the engine is operating in a skip fire mode, it will often be desirable to increase the firing fraction in conjunction with the up-shift to provide a more consistent engine power output and maintain NVH at acceptable levels. When the target firing fraction is higher than the current firing fraction (the "yes" branch of decision block 211), the ECU commands a transition to the new firing fraction (block 213). After the firing fraction transition has been commanded, the logic continues to monitor the CAN bus or other appropriate vehicle bus or signal lines for further status updates from the TCU. In parallel, a transition is made to the new firing fraction.

In theory, a transition to a new firing fraction could be implemented essentially as a step function in which a first firing fraction is used before the transition and the target firing fraction is used after the transition. However, applicants have found that more gradually transitioning from the initial firing fraction to the target firing fraction can help mitigate NVH. By way of example, a few firing fraction transition management schemes are described in Applicant's U.S. Pat. No. 9,086,020 (P011A); U.S. Pat. No. 9,200,575 (P029); U.S. Pat. No. 9,878,718 (P057B); U.S. Pat. No. 10,094,313 (P057X1) and U.S. Pat. No. 10,138,860 (P054X1), each of which in incorporated herein by reference. Therefore, in many operational circumstances there is some time delay associated with transitioning between firing fractions.

In practice the time period required to complete a firing fraction transition is usually less than the latency associated with a gear shift. For example, in some implementations, firing fraction transitions tend to complete within about 250-400 ms of the decision to initiate a firing fraction transition.

As discussed above, the NVH concerns associated with firing fraction changes that occur during gear shifts have been observed to correspond primarily to transitions that overlap the inertia/speed phase. In power-on up-shifts, the inertial/speed phase follows the fill and torque phases. As previously noted, typical periods associated with the fill phase of a transmission shift may be on the order of 150 ms and the torque phase may be on the order of 200-300 ms. Thus, in power-on up-shifts, the delay between the TCU indicating a new target gear and the initiation of the inertia phase of a gear shift tends to be on the order of a 350-450 ms. Therefore, if a firing fraction transition is commanded very shortly after the target gear is identified, there is a good probability that the transition will complete before the inertial/speed phase of the shift. Accordingly, the described "immediately initiate firing fraction transition" approach can significantly mitigate firing fraction transition related NVH associated with a gear shift.

It should be appreciated that in some operating circumstances, the target firing fraction may be the same as the current firing fraction as represented by the "no' branch from block 211. In such circumstances the firing fraction may be held constant through the end of the shift (block 215). For example, when the torque request is high at the time of the transmission up-shift, the engine may be in an all cylinder operating mode prior to the expected shift and thus the target firing fraction would be the same as the current firing fraction. In another example, the shift may occur when the engine is throttled while operating at a particularly smooth firing fraction (as for example a FF of ⅓), such that the same firing fraction can be used after the up-shift by simply increasing the cylinder torque fraction.

When the pending shift is not a qualified power-on up-shift (as represented by the "no" branch from block 207), the firing fraction is managed as appropriate for the vehicle's current state as represented by block 218. It should be appreciated that downshifts and up-shifts under different circumstances (non-qualifying up-shifts) may be treated differently that the described above for qualifying power-on up-shifts, and a variety of different firing fraction management schemes may be appropriate for different operating conditions.

In one example, a power-off up-shift may have a different firing management strategy than a qualifying power-on up-shift. For example, in some implementations, the engine may transition to a cylinder cut-off mode (DCCO, decel cylinder cut off) in which all of the cylinders are deactivated (i.e., none of the cylinders are fired) when the vehicle is coasting downhill—and there may be no need to transition out of the DCCO made in connection with the shift. In other circumstances, as for example when the engine is operating in a skip fire manner at a particularly low load level, it may be desirable to hold the current firing fraction through the shift and to adjust the firing fraction as appropriate after the shift completes. Alternatively, it may be desirable to permit the firing fraction to transition during the shift in such circumstances because the cylinder torque fraction may be low enough that NVH is not deemed to be a problem. The triggers for such "low load" treatment can vary—as for example, if the accelerator pedal position is less than a designated percentage (e.g. 8%) or lower than a designated percentage and trending lower.

In another example, if the engine is operating at a high torque output at the time an up-shift is indicated by the TCU, then all of the cylinders will likely be operating (i.e., the firing fraction is 1) and thus there would be no need to change the firing fraction in connection with the shift.

Similarly, when the shift is to a lower gear (i.e., a downshift), a somewhat different control logic may be employed. In some operational circumstances, it may be desirable to use a lower firing fraction in the target gear. In such cases, the current firing fraction will be able to deliver the desired torque at the new (target) firing fraction and since the lower gear will have a higher engine speed, NVH is unlikely to be a problem if the current firing fraction is still in use when the transmission first transitions to the new engine speed. Therefore, the firing fraction may be held at the then current level until the shift is completed. After the shift is completed, normal skip fire control may be used to instigate any firing fraction change that is appropriate for operation in the new gear.

It is noted that in other embodiments, the immediately change firing fraction approach described above with respect to qualified power-on up-shifts could also be used for certain downshifts as well. However, the firing fraction would most typically be reduced in conjunction with a downshift, since the engine speed will increase. A potential disadvantage is the potential of an increase in NVH during the shift due to the firing fraction transition. To this end, it should be appreciated that in a power-on downshift, the inertia/speed phase precedes the torque phase so there may be less time to complete the firing fraction change before the inertia/speed phase begins. In this respect power-on downshifts are somewhat like coast up-shifts (torque phase last). In contrast, coast downshifts are more like power-on up-shifts (inertia phase last). In the former cases the engine already wants to go the direction the transmission wants to go (higher or lower RPM) so the TCM can immediately start the inertia phase by partially releasing the off-going clutch.

Figure 3:
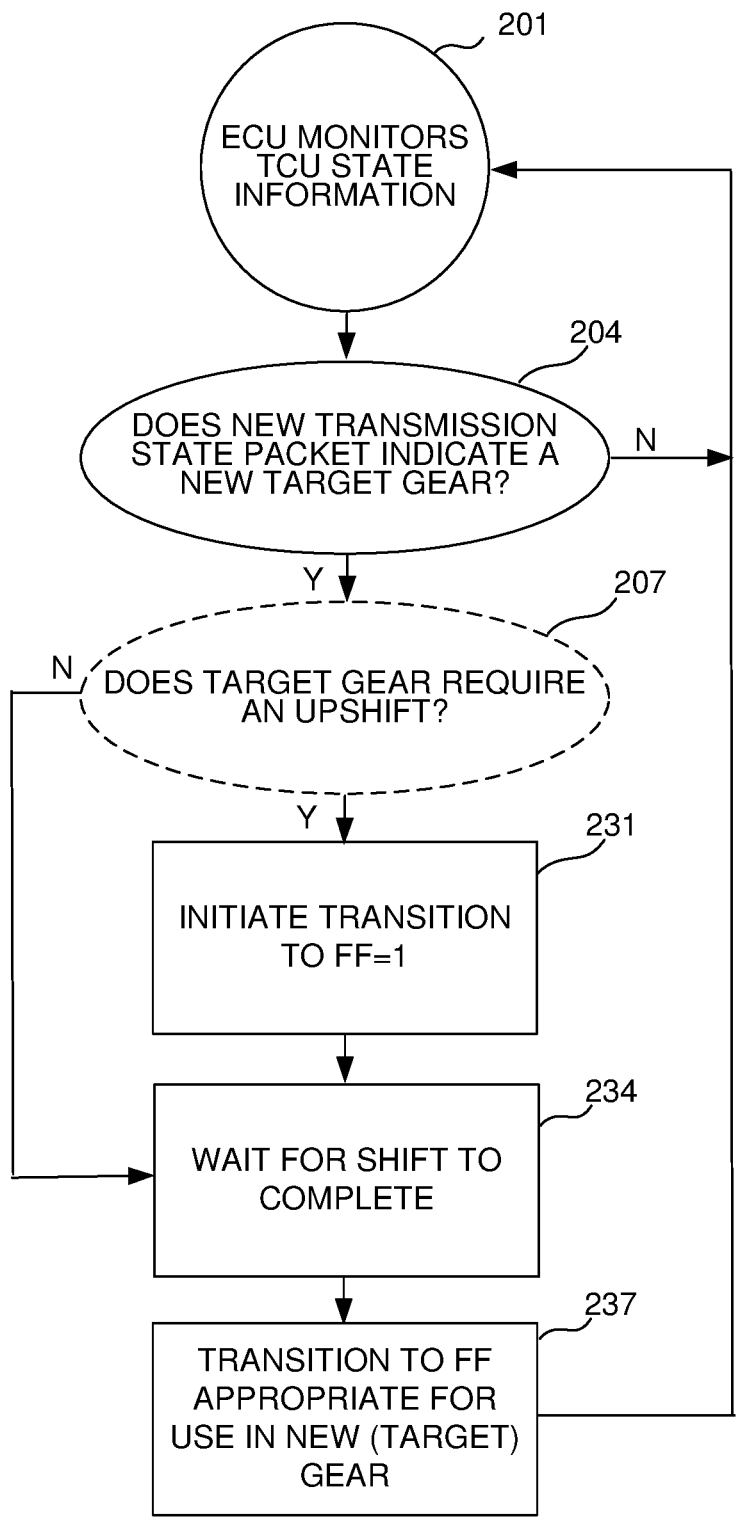
FIG. 3 is a flow chart illustrating a method of managing firing fraction transitions affiliated with gear shifts in accordance with a second embodiment.

Referring next to FIG. 3 another shift firing fraction management scheme will be described. Like in the previously described embodiment, the ECU 106 monitors the state information provided by the TCU 103 and determines when a new target gear has been identified (block 204). When the target gear and current operating conditions warrant (block 207) the ECU causes a transition to a designated transitional firing fraction (block 231). In the example, the transitional firing fraction is 1 (i.e., all cylinders firing). The transitional firing fraction is then maintained through the end of the shift operation (block 234). After the shift has completed, the ECU determines the firing fraction that is appropriate for use under the current conditions (e.g., gear, engine speed, torque demand, etc.) and directs a transition to that new firing fraction (block 237).

This two-stage transition process has potential advantages in a variety of different circumstances. For example, in circumstances such as the qualified power-on up-shifts discussed above with respect to FIG. 2, transitioning to all cylinder operation before the shift so that all cylinder operation occurs during the inertia phase of the shift can sometimes further reduce perceptible NVH during the shift. More specifically, it has been observed that when an engine operates in a skip fire manner during a shift, there tends to be a bit more NVH associated with shifts than when all of the cylinders are firing. It is believed that this may be due, at least in part, to the larger air charges and corresponding torque impulses that are occur during skip fire operation relative to the air charge that would typically be used in the same operating conditions using all cylinder operation. Since all cylinder operation tends to be the smoothest, a bit lower NVH can be attained by transitioning to all cylinder operation for the shift and then transitioning to the target firing fraction after the shift is completed. A potential disadvantage of transitioning to all cylinder operation for the shift is that it tends to increase fuel consumption. However, since shifting tends to be a relatively small portion of the overall drive cycle, an engine control designer may elect to accept the small efficiency penalty for the possibility of reducing the NVH (or vice versa).

In other implementations different transitional firing fractions can be used in appropriate circumstances. For example, firing fractions of ⅓, ½ and ⅔ tend to be quite smooth. Therefore, such firing fractions can be used as the transitional firing fraction in some situation—as for example, when it is known that the firing fraction both before and after the shift does not/will not exceed the transitional firing fraction. For example, if the firing fraction is ⅕ prior to the shift and is expected to be ¼ after the shift, a transitional firing fraction of ⅓ may be used instead of all cylinder operation. In other circumstances, the transitional firing fraction may be an intermediate firing fraction that is selected primarily on its NVH characteristics regardless of whether it is higher than one or both of the initial and target firing fractions. For example, if a firing fraction transition associated with a shift would change the firing fraction from ⅖ to ⅗, it may be desirable to utilize an intermediate transitional firing fraction of ½ during the shift. Although a few specific examples have been given to facilitate an understanding of the use of transitional firing fractions, it should be appreciated that the specific transitional firing fractions used as well as the specific operating conditions in which they are used may vary widely based on design goals and the characteristics of the specific engines.

Given that all cylinder operation (or selected other transitional firing fractions) tend to be smoother than other firing fractions, it can be desirable to use a similar transitional firing fraction based firing management strategy in connection with a variety of other shift conditions—as for example selected TCU initiated power-on downshifts, manual shifts, etc.

Figure 4:
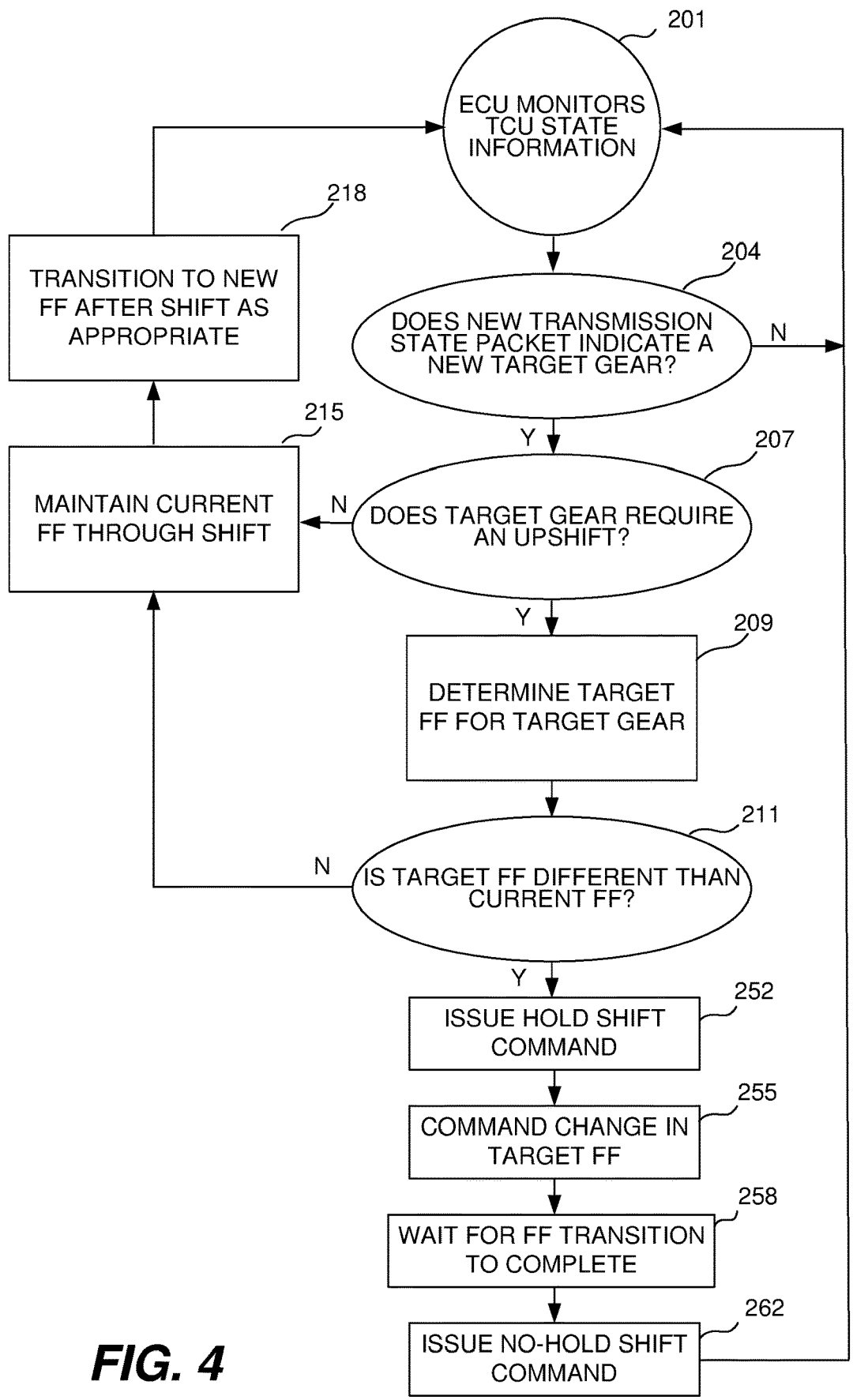
FIG. 4 is a flow chart illustrating a method of managing firing fraction transitions affiliated with gear shifts in accordance with a third embodiment.

Referring next to FIG. 4 another alternative shift firing fraction management scheme will be described. This approach is generally similar to the control scheme described with respect to FIG. 2 except that the TCU is designed to be responsive to a "hold shift" command from the ECU and will not initiate a shift without permission from the ECU. Like in the embodiment of FIG. 2, the ECU 106 monitors the state information provided by the TCU 103 and determines when a new target gear has been identified. The ECU then determines whether the pending shift is a qualified shift such as a power-on up-shift (block 207). If so, the ECU determines a target firing fraction for use in connection with the target gear (block 209). If the target firing fraction is different than the current operational firing fraction (block 211), the ECU issues a "hold-shift" command to the TCU (block 252). When the TCU receives the hold-shift command, it will not initiate a shift to the target gear until the hold is released. In parallel, the ECU directs a firing fraction change to the target firing fraction (block 255). After a designated trigger occurs (e.g., a designated delay period expires, the transition to the target firing fraction has been completed, or other suitable trigger) (block 258) the ECU issues a "no-hold-shift" command to the TCU (or otherwise releases the shift hold), at which point the TCU may implement the shift to the target gear. This approach of placing an explicit hold on the shift is a very conservative approach in that it helps ensure that the inertia phase of the shift (or, the initiation of the shift altogether if desired) cannot occur until after any desired firing fraction change has been completed.

The hold-shift approach can also be used in conjunction with a firing fraction transition management scheme as described above with reference to FIG. 3 in which the initial transition is to an intermediate (transitional) firing fraction that is used during the shift followed by a second transition to the desired operational (target) firing fraction after the shift has been completed.

In the embodiment described with reference to FIG. 4, the ECU sends a hold shift message to the TCU that should be affirmatively released by the ECU before the TCU instigates a shift. However, in other embodiments, the ECU may send a "delay shift" message that instructs the TCU to hold off the shift for a designated period of time (which may be explicit or implicit) to thereby give the ECU time to implement any needed firing fraction transition.

The above descriptions set forth above are primarily applicable to automatic transmissions (AT), and dual clutch transmissions (DCT). However, speculative selection of a transitional or target firing fraction can also be beneficial in the context of skip fire or other dynamic firing level modulation control of a vehicle having a manual transmission (MT). With a manual transmission, there is no TCU that broadcast its intent to initiate a gear shift. However, state information such as the current gear, target gear, and shift-in-progress can be determined by the ECU from sensors measuring clutch engagement and gear shift position.

A challenge presented by manual transmission shifts is that the driver typically releases the accelerator pedal in conjunction with depressing the clutch pedal and the driver's intent is generally unknown when the clutch pedal is first depressed. For example, the driver may be intending to up-shift, to down-shift, or to remain in the same gear. Further, the driver's intended post shift accelerator pedal response is generally unknown. For example, the driver may intend to break, coast, or aggressively accelerate after the clutch is reengaged. In some embodiments, it may be desirable to switch to all cylinder operation any time the clutch is engaged to be prepared to accommodate these different possibilities. After the shift is completed, the ECU or skip fire controller can transition to the firing fraction that is appropriate for use in conjunction with the new gear and post shift accelerator pedal position. Since the driver will often depress the accelerator pedal coming out of the shift, it can be helpful to hold the all cylinder operation for a brief period (as for example, on the order of a second) to get a better understanding of the drivers post-shift intentions before transitioning to a new firing fraction. The transition to all cylinder operation approach has the potential advantage of having the engine ready to respond to any of a variety of different post-shift scenarios. A tradeoff and potential disadvantage of such an approach is that it is less fuel efficient than might be desired. Thus, in some embodiments, it may be desirable to more actively control the firing fraction during manual transmission shifts.

When the clutch is disengaged by driver action in preparation for a gear shift, the engine is decoupled from the transmission. Consequently, the only torque generation required is to keep the engine at an appropriate speed, such as for example, an idle speed or a stall speed. Consequently, DCCO can be used if the clutch is not disengaged for too long. In still other situations, engine speed may be reduced by activating the intake and exhaust valves on one or more cylinders without combusting fuel in the cylinders. This will pump air through the engine inducing pumping losses, which will slow the engine faster than if the engine is operated in a DCCO mode. At about the time the clutch re-engages, the skip-fire controller can change fractions to the new fraction, selected using at least in part the newly selected gear. In this fashion, all firing fraction transitions are completed while the clutch is disengaged, and consequently there is minimal NVH produced through the drive train due to firing fraction transitions.

During a down shift (again, as determined by the change in shifter position), the engine can be automatically accelerated while the clutch is disengaged. For this, an appropriate firing density can be selected to provide the required torque to match the engine speed to the target drive train speed. The selection here will use different criteria than if the clutch is engaged, since the NVH consequences of the fraction choice are quite different (as no vibration can travel down the drivetrain). One possibility is to calculate the firing density from the torque request and air-per-cylinder, allowing any resulting firing density. At about the time the clutch re-engages, the skip-fire controller can change fractions to the new fraction, selected using at least in part the target gear, as in the up-shift case.

Although only a few embodiments of the invention have been described in detail, it should be appreciated that the invention may be implemented in many other forms without departing from the spirit or scope of the invention. For example, the invention has been described primarily in the context of skip fire operation—however it is equally applicable to gear shifts that occur during firing level modulation engine operation and other types of cylinder output level modulation. It is believed that the same approaches could also be used to manage variable displacement engine state transitions in conjunction with gear shifts as well. Also, the invention may be used with an automatic manual transmissions (AMT), which has attributes of both a manual and automatic transmission. The described approaches can be implemented in a variety of powertrains including powertrains that incorporate gasoline engines, diesel engines, or other types of internal combustion engines; hybrid powertrains that include an electric motor in addition to an engine, etc.

The invention has been described primarily in conjunction with power-on up-shifts since that is the type of shift that has been observed to be most susceptible to NVH concerns caused by firing fraction transitions. However, it should be apparent that similar techniques may be used to address NVH concerns associated with firing fraction transitions that occur with any types of gear shifts and/or in association with the use of clutches utilized in other drive train components.

Although a few specific examples have been given to facilitate an understanding of the use inventions, it should be appreciated that the specific firing management schemes used as well as the specific operating conditions in which they are used may vary widely based on design goals and the characteristics of the specific engines. Therefore, the present embodiments should be considered illustrative and not restrictive and the invention is not to be limited to the details given herein, but may be modified within the scope and equivalents of the appended claims.

What is claimed is:

1. A method of managing a powertrain having an internal combustion engine and a transmission during power-on up-shift transmission gear changes, the internal combustion engine being configured to operate in a skip fire operating mode, the method comprising:
    receiving an indication of a proposed gear change indicative of an intent to up-shift from a first transmission gear to a second transmission gear while the engine is operating at a first firing fraction that is less than one, the first transmission gear being a current operational gear and the second transmission gear being higher than the first transmission gear;
    transitioning from the first firing fraction to a firing fraction of one after receiving the indication of the proposed gear change;
    implementing a power-on up-shift in response to the indication of the proposed gear change, the power-on up-shift including a torque phase and an inertia phase that follows the torque phase, wherein the transition to the firing fraction of one is completed before entering the inertia phase of the power-on up-shift; and
    after completing the power-on up-shift, transitioning from the firing fraction of one to a second firing fraction suitable for use in the second transmission gear, the second firing fraction being a skip fire firing fraction.

2. A method as recited in claim 1 further comprising delaying the implementation of the power-on up-shift until after completion of the transition from the first firing fraction to the firing fraction of one.

3. A method as recited in claim 1 wherein the change to the firing fraction of one overlaps at least a portion of at least one of a fill phase and the torque phase of the gear shift.

4. A method as recited in claim 1 wherein the powertrain has an associated transmission control unit that controls operation of the transmission and an associated engine control unit that controls operation of the engine, and wherein the indication of the proposed gear change is generated by the transmission control unit and received by the engine control unit, the method further comprising:
    sending a hold shift instruction from the engine control unit to the transmission control unit when it is determined that the first firing fraction is not suitable for use after the gear change is completed; and
    sending a shift OK instruction from the engine control unit to the transmission control unit after a designated delay or after the change to the firing fraction of one is completed; and
    wherein the transmission control unit does not permit a gear shift to occur in a time period between the receipt of the hold shift instruction and the receipt of the shift OK instruction.

5. A method as recited in claim 1 further comprising setting a gear shift in progress indicator to a gear shift in progress state in response to the receipt of the indication of the proposed gear change and releasing the gear shift in progress indicator after the shift from the first transmission gear to the second transmission gear has been completed, wherein the transition to the second firing fraction is not permitted while the gear shift in progress indicator is in the gear shift in progress state.

6. A powertrain controller configured to implement the method of claim 1, the powertrain controller comprising an engine control unit and a transmission control unit, wherein:
    the indication of the proposed gear change is provided by the transmission control unit and the transmission control unit controls the shift from the first transmission gear to the second transmission gear; and
    the engine control unit is capable of directing skip fire operation of the engine, the engine control unit being configured to receive the indication of the proposed gear change, determine the second firing fraction and direct the change to the second firing fraction.

7. A method of managing a powertrain having an internal combustion engine and a transmission during power-on up-shift transmission gear changes, the internal combustion engine being configured to operate in a skip fire operating mode, the method comprising:
    receiving an indication of a proposed gear change indicative of an intent to up-shift from a first transmission gear to a second transmission gear while the engine is operating at a firing fraction of one, the first transmission gear being a current operational gear and the second transmission gear being higher than the first transmission gear;
    implementing a power-on up-shift in response to the indication of the proposed gear change, the power-on up-shift including a torque phase and an inertia phase that follows the torque phase;
    in response to the indication of the proposed gear change, preventing any firing fraction transition from initiating until after completion of the inertia phase of the power-on up-shift; and
    after completing the power-on up-shift, transitioning from the firing fraction of one to a second firing fraction suitable for use in the second transmission gear, the second firing fraction being a skip fire firing fraction.

8. A method as recited in claim 7 further comprising setting a gear shift in progress indicator to a gear shift in progress state in response to the receipt of the indication of the proposed gear change and releasing the gear shift in progress indicator after the shift from the first transmission gear to the second transmission gear has been completed, wherein the transition to the second firing fraction is not permitted while the gear shift in progress indicator is in the gear shift in progress state.

9. A powertrain controller configured to implement the method of claim 7, the powertrain controller comprising an engine control unit and a transmission control unit, wherein:
    the indication of the proposed gear change is provided by the transmission control unit and the transmission control unit controls the shift from the first transmission gear to the second transmission gear; and the engine control unit is capable of directing skip fire operation of the engine, the engine control unit being configured to receive the indication of the proposed gear change, determine the second firing fraction and direct the change to the second firing fraction.

10. A method of managing a powertrain having an internal combustion engine and a transmission during transmission gear changes, the internal combustion engine being configured to operate in a skip fire or other cylinder output level modulation operating mode, the method comprising:

receiving an indication of a proposed gear change indicative of an intent to shift from a first transmission gear to a second transmission gear, the first transmission gear being a current operational gear;

in response to the indication of the proposed gear change, determining whether a first effective firing fraction that is a current operational effective firing fraction is suitable for use during the transmission shift; and implementing the shift, wherein when it is determined that the current operational effective firing fraction is suitable for use during the transmission shift, the shift is implemented while maintaining the current operational effective firing fraction throughout the shift; and when it is determined that the current operational effective firing fraction is not suitable for use during the transmission shift, transitioning to a second effective firing fraction that is suitable for use during the shift before an inertia phase of the shift is initiated.

11. A method as recited in claim 10 further comprising, after completing the shift, transitioning to a third effective firing fraction that is suitable for use in the second transmission gear, the third effective firing fraction being a skip fire or other cylinder output level modulation firing fraction.

12. A method as recited in claim 11 wherein the shift is a power-on up-shift.

13. A method as recited in claim 11 performed during skip fire operation of the engine, whereby the first and third effective firing fractions are skip fire firing fractions.

14. A method as recited in claim 11 performed during cylinder output level modulation operation of the engine.

15. A method as recited in claim 10 wherein the change to the second effective firing fraction overlaps at least a portion of at least one of a fill phase and a torque phase of the gear shift.

16. A method as recited in claim 10 further comprising completing the change to the second effective firing fraction before beginning the gear shift.

17. A method as recited in claim 10 wherein the powertrain has an associated transmission control unit that controls operation of the transmission and an associated engine control unit that controls operation of the engine, and wherein the indication of the proposed gear change is generated by the transmission control unit and received by the engine control unit, the method further comprising:

sending a hold shift instruction from the engine control unit to the transmission control unit when it is determined that the current operational effective firing fraction is not suitable for use after the gear change is completed; and sending a shift OK instruction from the engine control unit to the transmission control unit after a designated delay or after the change to the second effective firing fraction is completed; and wherein the transmission control unit does not permit a gear shift to occur in a time period between the receipt of the hold shift instruction and the receipt of the shift OK instruction.

18. A powertrain controller configured to implement the method of claim 10, the powertrain controller comprising an engine control unit and a transmission control unit, wherein:

the indication of the proposed gear change is provided by the transmission control unit and the transmission control unit controls the shift from the first transmission gear to the second transmission gear; and the engine control unit is capable of directing skip fire or other cylinder output level modulation operation of the engine, the engine control unit being configured to receive the indication of the proposed gear change, determine the second firing fraction and direct the change to the second firing fraction.

19. An engine controller configured to direct skip fire operation of an internal combustion engine that is part of a powertrain including the engine and a transmission, the engine controller being configured to:

during skip fire operation of the engine, receive an indication of a proposed gear change indicative of an intent to up-shift from a first transmission gear to a second transmission gear while the engine is operating at a first firing fraction that is less than one, the first transmission gear being a current operational gear and the second transmission gear being higher than the first transmission gear, wherein the power-on up-shift includes a torque phase and an inertia phase that follows the torque phase;

direct the engine to transition from the first firing fraction to a firing fraction of one after receiving the indication of the proposed gear change and causing the transition to the firing fraction of one to be completed before the inertia phase of the power-on up-shift is entered; and after the power-on up-shift is completed, direct the engine to transition from the firing fraction of one to a second firing fraction suitable for use in the second transmission gear, the second firing fraction being a skip fire firing fraction.

20. An engine controller as recited in claim 19 further configured to cause the change to the firing fraction of one to overlap at least a portion of at least one of a fill phase and the torque phase of the gear shift.

21. An engine controller as recited in claim 19 further configured to:

send a hold shift instruction to a transmission control unit when it is determined that the first firing fraction is not suitable for use after the gear change is completed; and when the hold shift instruction has been sent, send a shift OK instruction to the transmission control unit after a designated delay or after the change to the firing fraction of one is completed.

22. An engine controller as recited in claim 19 further configured to:

set a gear shift in progress indicator to a gear shift in progress state in response to the receipt of the indication of the proposed gear change; and release the gear shift in progress indicator after the shift from the first transmission gear to the second transmission gear has been completed, wherein the transition to the second firing fraction is not permitted while the gear shift in progress indicator is in the gear shift in progress state.

23. An engine controller configured to direct operation of an internal combustion engine that is part of a powertrain including the engine and a transmission in a skip fire or other cylinder output level modulation operating mode, the engine controller being configured to:
- receive an indication of a proposed gear change indicative of an intent to shift from a first transmission gear to a second transmission gear, the first transmission gear being a current operational gear;
- in response to the indication of the proposed gear change, determine whether a first effective firing fraction that is a current operational effective firing fraction is suitable for use during the transmission shift;
- direct the engine to maintain the current operational effective firing fraction throughout the shift when it is determined that the current operational effective firing fraction is suitable for use during the transmission shift; and
- direct the engine to transition to a second effective firing fraction that is suitable for use during the shift before an inertia phase of the shift is initiated when it is determined that the current operational effective firing fraction is not suitable for use during the transmission shift.

24. An engine controller as recited in claim 23 further configured to direct the engine to transition to a third effective firing fraction that is suitable for use in the second transmission gear after completing the shift, the third effective firing fraction being a skip fire or other cylinder output level modulation firing fraction.

25. An engine controller as recited in claim 23 further configured to cause the change to the second effective firing fraction to overlap at least a portion of at least one of a fill phase and a torque phase of the gear shift.

26. An engine controller as recited in claim 23 wherein the engine controller is further configured to:
- send a hold shift instruction to a transmission control unit when it is determined that the current operational effective firing fraction is not suitable for use after the gear change is completed; and
- when a hold shift instruction has been sent, send a shift OK instruction to the transmission control unit after a designated delay or after the change to the second effective firing fraction is completed.

\* \* \* \* \*